(12) United States Patent
Gamberini

(10) Patent No.: US 7,237,668 B2
(45) Date of Patent: Jul. 3, 2007

(54) DEVICE AND METHOD FOR SORTING ITEMS, SUCH AS ROLLS

(75) Inventor: Gianluigi Gamberini, Bologna (IT)

(73) Assignee: T.M.C. S.p.A., Bologna (IT)

( * ) Notice: Subject to any disclaimer, the term of this patent is extended or adjusted under 35 U.S.C. 154(b) by 410 days.

(21) Appl. No.: 10/468,049

(22) PCT Filed: Jul. 25, 2002

(86) PCT No.: PCT/IB02/02947

§ 371 (c)(1),
(2), (4) Date: Aug. 13, 2003

(87) PCT Pub. No.: WO03/011694

PCT Pub. Date: Feb. 13, 2003

(65) Prior Publication Data

US 2004/0112711 A1  Jun. 17, 2004

(30) Foreign Application Priority Data

Jul. 30, 2001 (CH) ..................... 1415/01

(51) Int. Cl.
*B65G 47/10* (2006.01)
(52) U.S. Cl. .................... 198/369.1; 209/922
(58) Field of Classification Search ............ 209/922; 198/348, 360, 369.1, 445, 447, 448
See application file for complete search history.

(56) References Cited

U.S. PATENT DOCUMENTS 3,193,078 A * 7/1965 Amenta et al. .......... 198/419.1
3,580,141 A * 5/1971 Richter .................. 493/27

(Continued)

FOREIGN PATENT DOCUMENTS

| EP | 0 899 196 A1 | 3/1999 |
| FR | 1.269.978 | 8/1961 |
| JP | 61150919 A * | 7/1986 |
| JP | 62249818 A * | 10/1987 |

OTHER PUBLICATIONS

International Search Report corresponding to International Application No. PCT/IB02/02947.

*Primary Examiner*—Patrick Mackey
*Assistant Examiner*—Matthew J. Kohner
(74) *Attorney, Agent, or Firm*—Fay, Sharpe, Fagan, Minnich & McKee, LLP

(57) ABSTRACT

The device for sorting items, such as rolls, is provided downstream of a first number (N) of feeding channels (Ca) of items (R), which feeding channels (Ca) are provided with dispensing members (8) for a controlled release of the items (R). The device (100) includes: a number of mobile tracks (5) equal to the first number (N), arranged downstream of the N feeding channels (Ca) and operatively associated in pairs, so as to define operating gaps (H1) between successive pairs. The first mobile tracks (5) are movable in reciprocal synchronism, transversally (W) to the feeding channels (Ca). A second number (M) of second mobile tracks (6) are arranged downstream of the feeding channels (Ca) and are disposed each one between successive pairs of the first tracks (5) at the operating gaps (H1). The second tracks (6) are movable both in synchronism with the first tracks (5), transversally (W) to the feeding channels (Ca), and in phase relation with operation of the first tracks (5), transversally (W1) to the feeding channels (Ca), within the operating gaps (H1).

7 Claims, 5 Drawing Sheets

U.S. PATENT DOCUMENTS

| | | | |
|---|---|---|---|
| 3,599,789 A * | 8/1971 | Kurczak | 209/577 |
| 3,752,293 A * | 8/1973 | Fort | 198/383 |
| 4,051,964 A * | 10/1977 | Meijer | 414/800 |
| 4,060,165 A * | 11/1977 | Bauer | 198/442 |
| 4,066,163 A * | 1/1978 | Rowekamp | 198/418.5 |
| 4,129,207 A * | 12/1978 | Cupp | 198/445 |
| 4,258,850 A * | 3/1981 | Solaroli | 209/655 |
| 4,440,289 A | 4/1984 | Weis | |
| 4,601,383 A * | 7/1986 | Phillipson | 198/448 |
| 4,895,245 A * | 1/1990 | Bauers et al. | 198/458 |
| 5,121,826 A * | 6/1992 | Scheurer | 198/369.1 |
| 5,174,430 A * | 12/1992 | Ebira | 198/418.5 |
| 5,186,306 A * | 2/1993 | Sjostrand | 198/442 |
| 5,195,300 A | 3/1993 | Kovacs et al. | |
| 5,205,393 A * | 4/1993 | Malow et al. | 198/369.5 |
| 5,228,550 A * | 7/1993 | Munch | 198/447 |
| 5,429,223 A * | 7/1995 | Moeller | 198/369.1 |
| 5,944,165 A * | 8/1999 | Mannlein et al. | 198/442 |
| 6,029,424 A * | 2/2000 | McEvoy et al. | 53/443 |
| 6,463,713 B1 * | 10/2002 | Ruemeli | 53/52 |
| 6,772,872 B2 * | 8/2004 | Spangenberg et al. | 198/442 |
| 6,895,730 B2 * | 5/2005 | Weaver et al. | 53/500 |

* cited by examiner

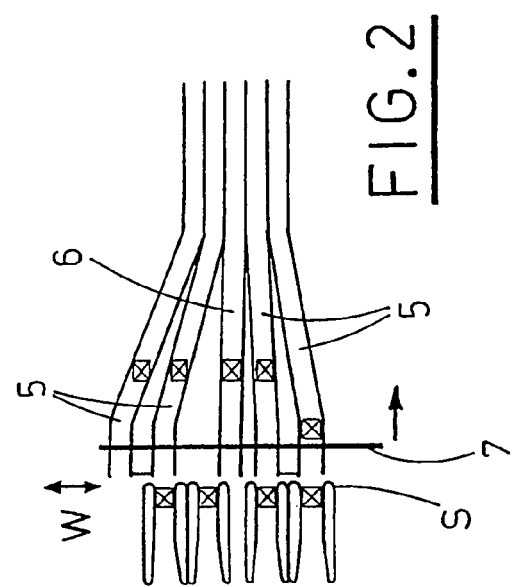
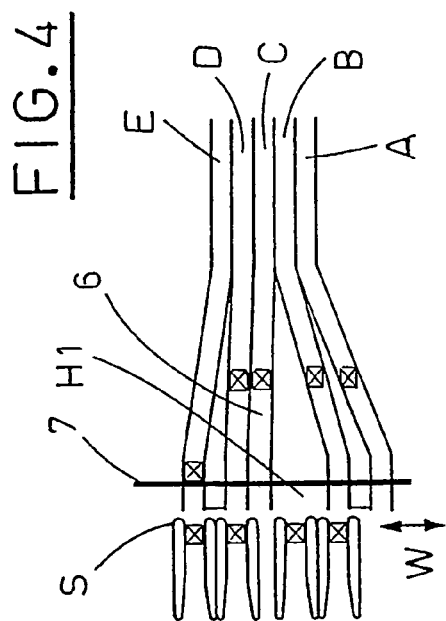
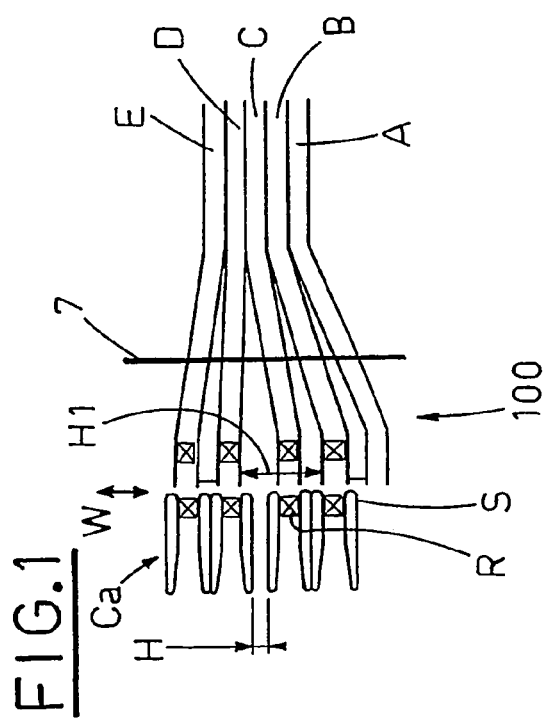
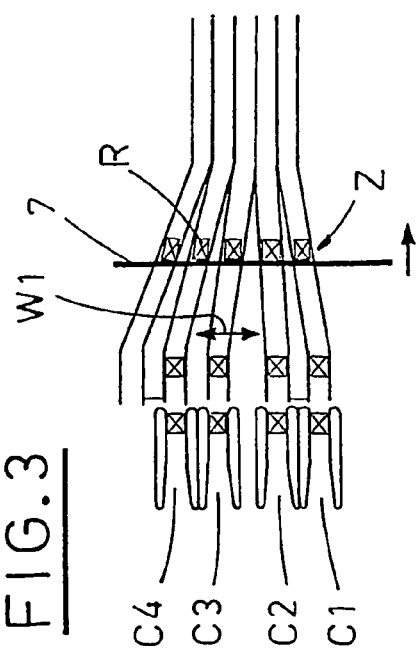

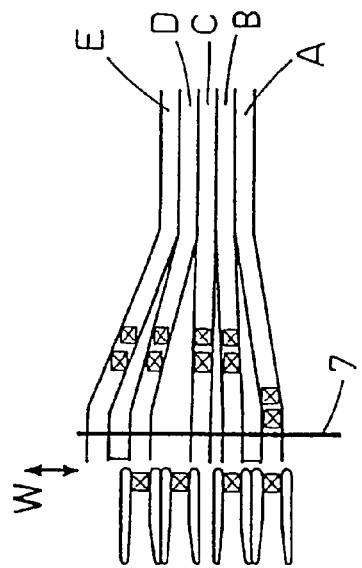
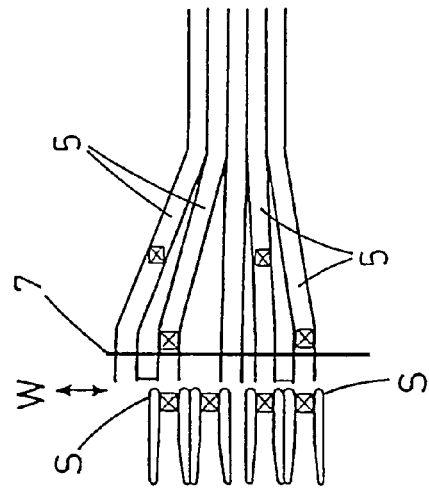
FIG. 8a
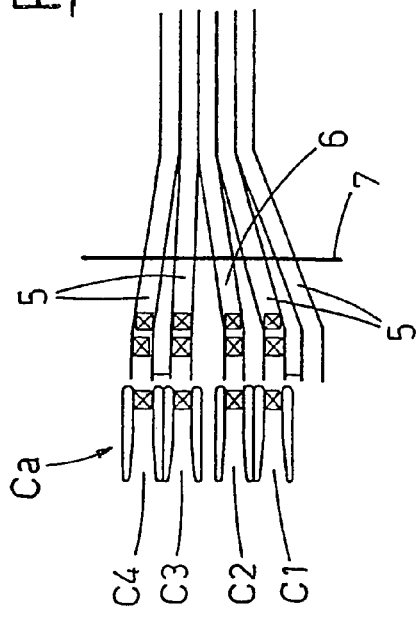
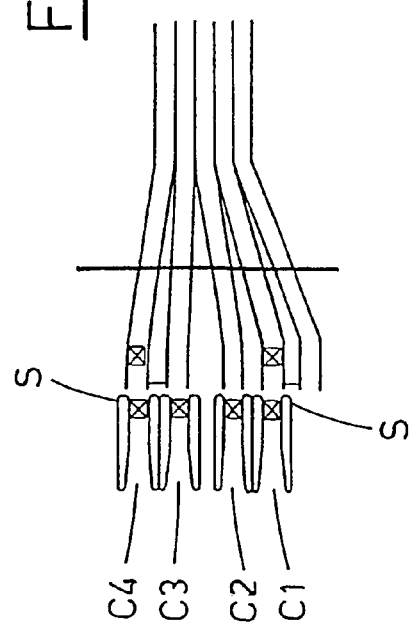
FIG. 8b

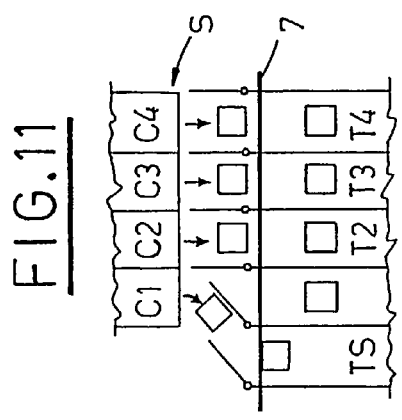
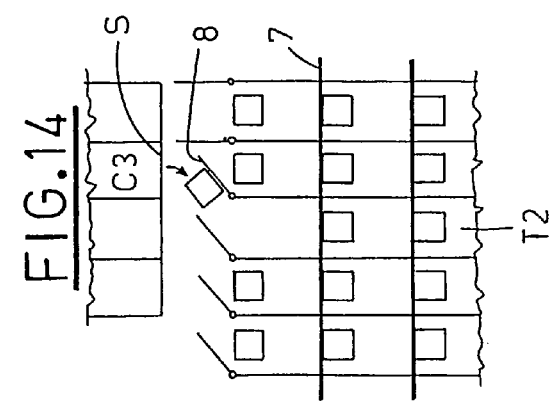
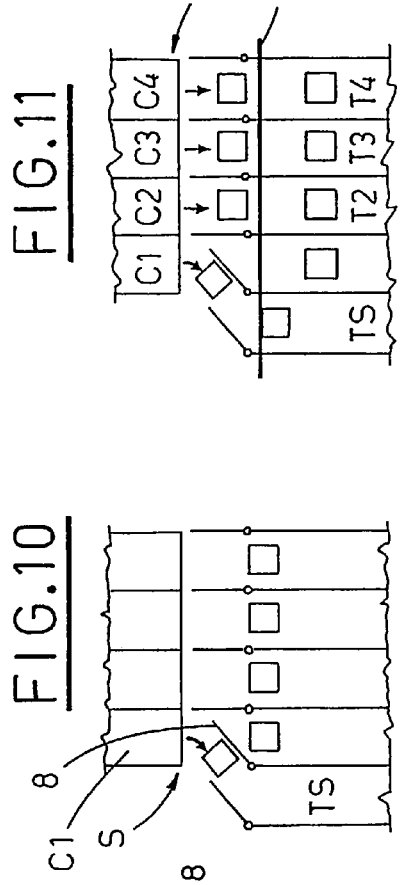
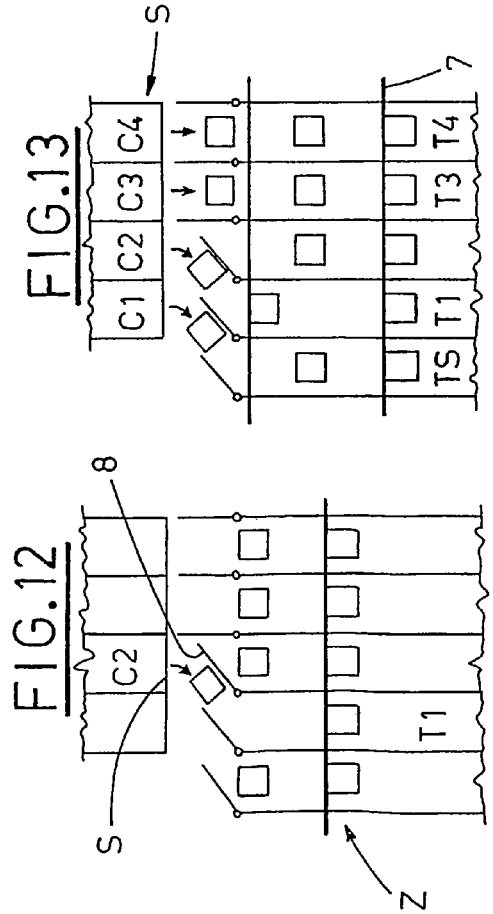
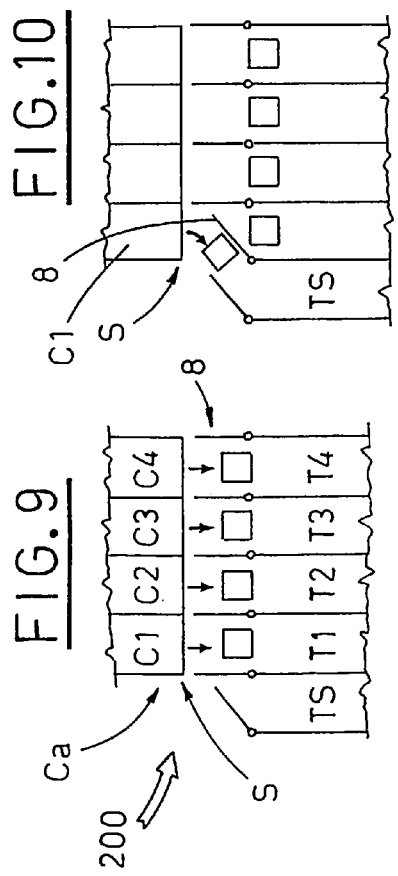

DEVICE AND METHOD FOR SORTING ITEMS, SUCH AS ROLLS

TECHNICAL BACKGROUND OF THE INVENTION

The present invention relates to the technical field of automatic lines for forming and packaging parcels of items, such parcels usually consisting of one or more rows of items arranged in one or more layers and wrapped into protective sheet of heat-weldable type plastic material.

More in particular, the present invention relates to a device and method for sorting a series of items in output from a plurality of feeding channels and directed to a receiving section, so as to arrange the same items according to one or more side-by-side transversal rows.

DESCRIPTION OF THE PRIOR ART

As known, in current lines for forming and packaging items, such as toilet paper rolls, blotting paper rolls etc., the latter are first formed and singled out, at special operating stations, and then routed towards a complex apparatus known as "diverter" or "combiner" or "sorting machine", which sorts and conveys such items towards a series of feeding channels, in equal, smaller or larger number than the lines feeding the same apparatus.

Such feeding channels, in co-operation with relevant dispensing members, feed the rolls towards successive stations, so as to define the parcel to be packaged.

Starting from a predetermined number of such feeding channels, usually provided in the maximum number of four, the sequences currently used allow realising parcels consisting of side-by-side transversal rows, each comprising a smaller number of rolls than the number of the above feeding channels, or at most a number of rolls equal to the number of the same feeding channels.

It is evident that the above operating procedures used in the current lines for forming and packaging parcels of rolls set a limit to the possibility of packaging a parcel with transversal rows comprising any number of rolls, for example larger than the number of feeding channels by one or more units.

This certainly is a disadvantage for the current lines for forming and packaging parcels of items.

SUMMARY OF THE INVENTION

A main object of the present invention is that of proposing a device and a method for sorting items, in particular rolls, which should remedy the above disadvantages yet to be overcome and present in the prior art.

More in particular, a fundamental object of the present invention is to provide a device and a method for sorting items, for example rolls, which starting from any predetermined number of channels for feeding a plurality of single items, should allow sorting them so as to define transversal rows of items comprising a larger number—by at least one unit—than the number of said feeding channels, and transferring said rows towards the successive operating stations to complete the packaging.

Another object of the invention is to propose a device and a method for sorting items, for example rolls, capable of ensuring high reliability and performance standards in any operating step, and such as to meet any requirement for forming parcels in any number of items for each transversal row of the same.

The above objects are entirely achieved according to what reported in the claims.

BRIEF DESCRIPTION OF THE DRAWINGS

The features of the invention will appear more clearly from the following description of preferred but non-exclusive embodiments of the device for sorting items, object of the present invention, as well as relevant exemplifying but non-limiting sequences of operating steps of the proposed method, with reference to the attached drawings. In such drawings:

FIGS. 1, 2, 3, 4, 5, 6, 7, 8, show schematic plan views of a first possible embodiment of the device for sorting items, such as rolls, subject of the present invention, as well as the sequence of the operating steps of the method relating to an example of formation of parcels of items consisting of transversal rows comprising a number of items which is larger by one unit than the number of feeding channels;

FIGS. 8a and 8b show schematic plan views of two possible variants of sequence of operating steps of the proposed device;

FIGS. 9, 10, 11, 12, 13, 14, 15, 16, 17, show schematic plan views of a second possible embodiment of the device for sorting items, such as rolls, which is the subject of the present invention, as well as the sequence of the operating steps of the method, relating to an example of formation of parcels of items consisting of transversal rows comprising a number of items which is larger by one unit than the number of feeding channels.

DESCRIPTION OF THE PREFERRED EMBODIMENTS

Figure 6:
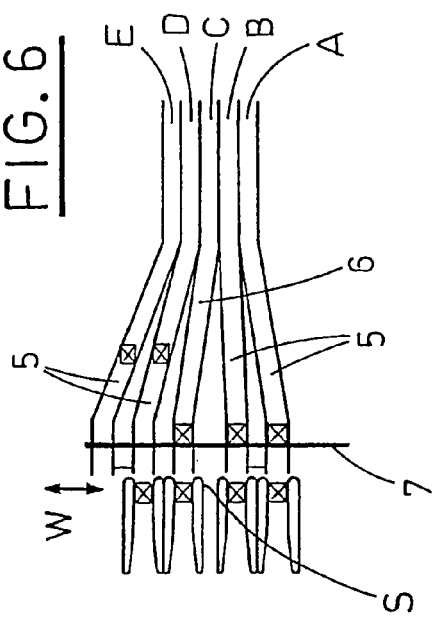

The method for sorting items, such as rolls, which is the subject of the present invention, basically provides for the following steps: arranging a series of items R within a first number N of feeding channels Ca of said items, said N feeding channels Ca being provided, at the relevant output sections, with dispensing members S for a controlled release of said items R according to predetermined sequences; operating mobile tracks 5, 6, 8, provided downstream of said N feeding channels Ca and including at least one supplementary track in addition to the number of said N feeding channels Ca, in phase relation with the actuation of said dispensing members S and in accordance with the above predetermined sequences, so as to face said N feeding channels Ca and receive the items released by them, and so as to define, in co-operation with the driving bars 7, at least one transversal row Z of items comprising at least one additional item to the number N of said feeding channels Ca and afterwards transfer at least said row Z towards successive packaging operating stations.

With reference to the attached drawings, in particular from FIG. 1 to FIG. 8, reference numeral 100 denotes a first embodiment of the device for sorting items, such as rolls, which is the subject of the present invention.

Such device 100 is provided downstream of N feeding channels Ca of a series of items R formed and singled out at previous apparatus (not shown), said N feeding channels Ca being associated in pairs, the latter being spaced from one another by equal steps H, and provided, at the relevant output sections, with dispensing members S for a controlled release of said items R.

The device 100 is also provided with N first mobile tracks 5, arranged downstream of said N feeding channels Ca and operatively associated in pairs, so as to exhibit operating gaps H1 between successive pairs, facing the above steps H.

Such N first mobile tracks 5 can be moved in reciprocal synchronism, transversally W to the N feeding channels Ca.

The device 100 is also provided with a second number M of second mobile tracks 6, each arranged downstream of the N feeding channels Ca and inserted between successive pairs of said N first tracks 5 at the operating gaps H1.

Such M second tracks 6 can be moved both in synchronism with the N first tacks 5, transversally W to the N feeding channels Ca, and in phase relation with the N first tracks 5, transversally W1 to the N feeding channels Ca in the operating gaps H1.

The N first tracks 5 and the M second tracks 6, following the corresponding movements, respectively in synchronism for the N first tracks 5 and in a sequence, in synchronism with the first tracks and in phase relation with the first tracks, for the M second tracks 6, are intended to face the N feeding channels Ca according to predetermined sequences, for receiving items in a number equal to the sum of the first number N and of the second number M (N+M). The items are released by feeding channels for defining, in co-operation with driving bars 7 moving longitudinally above the same first 5 and second 6 tracks for contacting and pulling such items, respective and distinct transversal rows Z of M+N items and for transferring the same rows Z of M+N items towards successive packaging operating stations.

The above N first tracks 5 and the M second tracks 6 are interlocked with two separate and independent actuating members, not shown.

Optionally, it is possible to provide for the interlocking of both the N first tracks 5 and the M second tracks 6 with the same actuating member.

In particular in figures from 1 to 8, device 100 is shown considering, merely by way of an example, a number N of feeding channels Ca equal to four (N=4), respectively indicated with reference numerals C1, C2, C3, C4.

Channels C1 and C2, as well as channels C3, C4, are reciprocally coupled: the distance between the pairs is equal to step H.

Accordingly, device 100 is provided with four first mobile tracks 5, respectively indicated with reference letters A, B, D, E, and coupled two by two, that is, A with B, and D with E. The two pairs of tracks A, B and D, E are spaced from one another by an operating gap H1 within which there is provided a single second mobile track 6, indicated with reference letter C.

The operation of device 100 is described hereinafter, considering as initial configuration that shown in FIG. 1, and illustrating an exemplifying possible mode for actuating the same device for forming four successive transversal rows Z, each consisting of five items.

Formation of the First Row (Reference Shall be Made to FIGS. 1 and 2)

The dispensing members S release four items R, each from a corresponding feeding channel C1, C2, C3, C4 of the four feeding channels Ca.

Such four items are received by tracks B, D, E of the first mobile tracks 5, and by track C.

In phase relation with the release of the above four items, the first 5 and the second 6 mobile tracks are actuated in reciprocal synchronism, transversally W to the feeding channels Ca, so as to get the configuration of FIG. 2, that is: track A faces channel C1, track B faces channel C2, track C is arranged at step H, and is therefore inoperative, track D faces channel C4.

Then, the dispensing member S of channel C1 releases a corresponding item, which inserts in track A and, at the same time, the driving bar 7, longitudinally mobile above the first and second mobile tracks, contacts such items to define the first row of five items and transfer the same downstream, towards successive operating stations.

Formation of the Second Row (Reference Shall be Made to FIGS. 3 and 4)

Track C is actuated in phase relation with the operation of the driving bar 7, transversally W1 to the feeding channels Ca within the operating gap H1 so as to face channel C3.

At this point, the dispensing members S release four items R, each from a corresponding feeding channel C1, C2, C3, C4 of the four feeding channels Ca.

Such four items are received by tracks A, B, D of the first mobile tracks 5, and by track C.

In phase relation with the release of the above four items, the first 5 and the second 6 mobile tracks are actuated, in reciprocal synchronism, transversally W to the feeding channels Ca, so as to reach the configuration of FIG. 4, that is: track B faces channel C1, track D faces channel C3, track C is arranged at step H, and is therefore inoperative, track E faces channel C4.

Now, the dispensing member S of channel C4 releases a corresponding item, which enters track E and at the same time, the driving bar 7, longitudinally mobile above the first and the second mobile tracks, goes in contact with such items to define the second row of five items and transfer the row downstream, towards successive operating stations.

Figure 5:
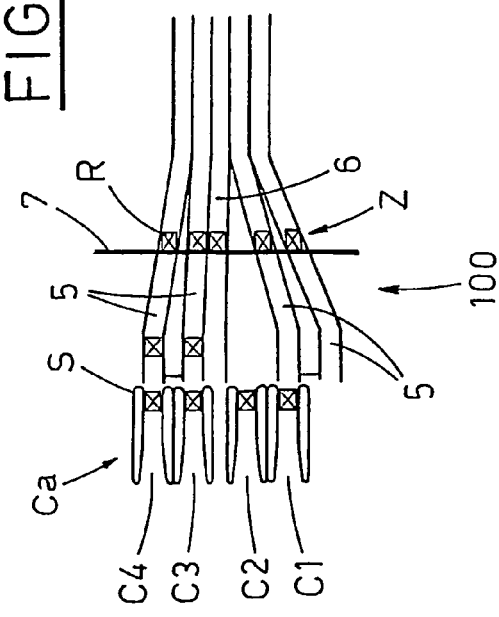

Formation of the Third Row (Reference Shall be Made to FIGS. 5 and 6)

The dispensing members S of channels C3 and C4 release two items R, each from a corresponding feeding channel C3, C4 of the four feeding channels Ca.

Such two items R are received by tracks D, E of the first mobile tracks 5.

In phase relation with the release of the above two items, the first 5 and the second 6 mobile tracks are actuated, in reciprocal synchronism, transversally W to the feeding channels Ca, so as to reach the configuration of FIG. 6, that is: track A faces channel C1, track B faces channel C2, track C faces channel C3, whereas track D faces channel C4.

After this configuration has been set, the dispensing member S of channels C1, C2 and C3 release three items, each from a corresponding feeding channel C1, C2, C3 of the four feeding channels.

Such three items are respectively received by tracks A, B and C.

In phase relation with the release of the last three items, the driving bar 7 goes to contact the items to define the third row of five items and transfer the row downstream, towards successive operating stations.

Figure 8:
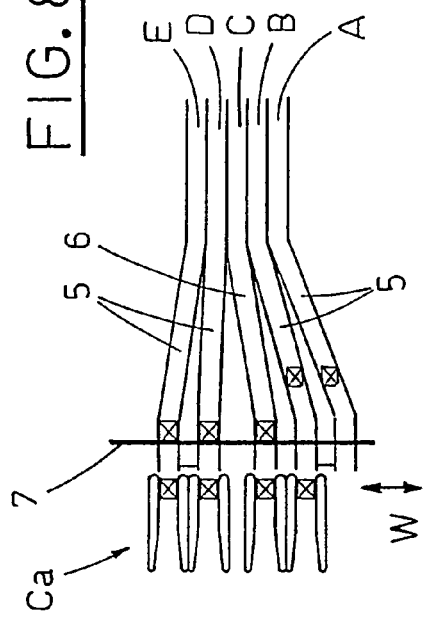
Figure 7:
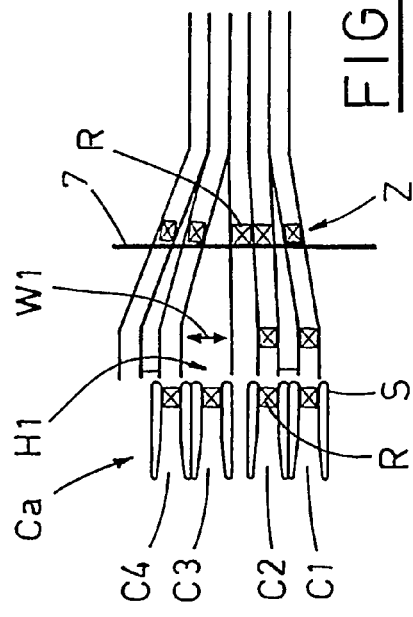

Formation of the Fourth Row (Reference Shall be Made to FIGS. 7 and 8)

Track C is actuated in phase relation with the operation of the driving bar 7, transversally W1 to the feeding channels Ca within the operating gap H1 so as to arrange at step H and adjacent to track B.

The dispensing members S of channels C1 and C2 release two items R, each from a corresponding feeding channel C1, C2 of the four feeding channels Ca.

Such two items R are received by tracks A, B of the first mobile tracks 5.

In phase relation with the release of the above two items, the first 5 and the second 6 mobile tracks are actuated, in reciprocal synchronism, transversally W to the feeding channels Ca, so as to reach the configuration of FIG. 8, that is:

track B faces channel C1, track C faces channel C2, track D faces channel C3, whereas track E faces channel C4.

Then, the dispensing member S of channels C2, C3 e C4 release three items, each from a corresponding feeding channel C2, C3, C4 of the four feeding channels.

Such three items are respectively received by tracks C, D and E.

In phase relation with the release of the last three items, the driving bar 7 goes to contact the items to define the fourth row of five items and transfer them downstream, towards subsequent operating stations.

It should be noted that the configuration of the first 5 and of the second 6 mobile tracks reached in such operating step (FIG. 8), coincides with that of FIG. 1, that means that the, device 100 is ready to carry out further sequences to define further transversal rows of five items.

In addition, the above device 100 is capable of realising multiple transversal rows of five items; in fact, it is sufficient to have the dispensing members carry out multiple releases of items upon each activation: reference should be made, for example, to FIG. 8a, which shows the multiple release of two items.

In the example described, device 100 has sorted items starting from four channels to obtain rows of five items; in any case, the same device can sort items starting from two feeding channels, such as C1 and C4, to obtain rows of four items (reference should be made, for example, to FIG. 8b).

With reference to the attached drawings, in particular from FIG. 9 to FIG. 17, a further possible embodiment of the device is shown (indicated with reference numeral 200) for sorting items R, such as rolls, which is the subject of the present invention.

Device 200 is provided with a third number T of mobile tracks 8 arranged downstream of the N feeding channels Ca and comprising an additional track Ts to the number of the latter.

Such T mobile tracks 8 can be operated one by one and in a sequence, in phase relation with the release of items R by the dispensing members S according to predetermined sequences, so as to face the N feeding channels Ca for receiving T items released by them and defining, in co-operation with driving bars 7 longitudinally mobile above the same mobile tracks 8, respective and distinct transversal rows Z of T items, to transfer the same rows Z of T items towards subsequent packaging operating stations.

Such T mobile tracks 8 may all be interlocked with a same actuating member, or as an alternative, each mobile track 8 may be provided with a relevant and corresponding actuating member.

In the attached exemplifying drawings from FIG. 9 to FIG. 17, the first number N of feeding channels Ca has been considered as equal to four, whereas the third number T of the mobile tracks 8 has been considered as equal to five.

The same figures from 9 to 17 schematically show, according to a possible exemplifying operating mode of such embodiment of device 200, the successive operating steps that, starting from four feeding channels Ca, allow obtaining transversal rows Z of items, each comprising five items R.

References C1, C2, C3, C4 denote the N=4 feeding channels, whereas T1, T2, T3, T4, Ts denote the T=5 mobile tracks 8, where Ts is the additional mobile track to the number of feeding channels.

Formation of the First Row (Reference Shall be Made to FIGS. 9 and 10)
the dispensing means S are operated to release four items (which have been indicated with the reference numeral 1), each one from a relevant channel C1, C2, C3, C4 of the four feeding channels Ca, and the above-mentioned four items are directed into the relevant first four mobile tracks T1, T2, T3, T4 of the five mobile tracks 8;
the dispensing means S are operated again for releasing an additional item (also indicated with the reference numeral 1) from the first channel C1 of the four feeding channels, and at the same time the mobile tracks 8 are operated so as to direct this additional item to the mobile track, of the above-mentioned mobile tracks, which is not engaged by any of the items released previously; in particular, the additional item is directed to the supplementary track Ts of the mobile tracks 8;
the driving bar 7 is operated for contacting such items to define the first row of five items and to transfer the row towards subsequent operating stations.

Formation of the Second Row (Reference Shall be Made to FIGS. 11 and 12)
the dispensing means S are operated to release four items (which have been indicated with the reference numeral 2), each one from a relevant channel C1, C2, C3, C4 of the four feeding channels Ca, and the above-mentioned four items are directed into relevant four mobile tracks of the five mobile tracks 8; in particular, the item released by the first feeding channel C1 is directed to the supplementary mobile track Ts whereas the other items released by relevant channels (that is to say the second C2, third C3, fourth C4 channels) are directed to the relevant mobile tracks which face them (which are the second T2, the third T3 and the fourth T4 tracks);
the dispensing means S are operated again for releasing an additional item (also indicated with the reference numeral 2) from the second channel C2 of the four feeding channels, and at the same time the mobile tracks 8 are operated so as to direct this additional item to that mobile track, of the above-mentioned five mobile tracks, which is not engaged by any of the four items released previously; in particular, the additional item is directed to first mobile track T1;
the driving bar 7 is operated for contacting such items to define the second row of five items and to transfer the row towards subsequent operating stations.

Formation of the Third Row (Reference Shall be Made to FIGS. 13 and 14)
the dispensing means S are operated to release four items (which have been indicated with the reference numeral 3), each one from a relevant channel C1, C2, C3, C4 of the four feeding channels Ca, and the above-mentioned four items are directed to relevant four mobile tracks of the five mobile tracks 8; in particular, the item released by the first feeding channel C1 is directed to the supplementary mobile track Ts and the item released by the second channel C2 is directed to the first mobile track T1, whereas the other items released by relevant channels C3 and C4 are directed to the relevant mobile tracks, i.e. the third T3 and the fourth T4 tracks;
the dispensing means S are operated again for releasing an additional item (also indicated with the reference numeral 3) from the third channel C3 of the four feeding channels, and at the same time the mobile tracks 8 are operated so as to direct this additional item to that mobile track, of the above-mentioned five mobile tracks, which is not engaged by any of the four items released previously; in particular, the additional item is directed to second mobile track T2;

the driving bar 7 is operated for contacting such items to define the second row of five items and to transfer the row towards subsequent operating stations.

Figure 17:
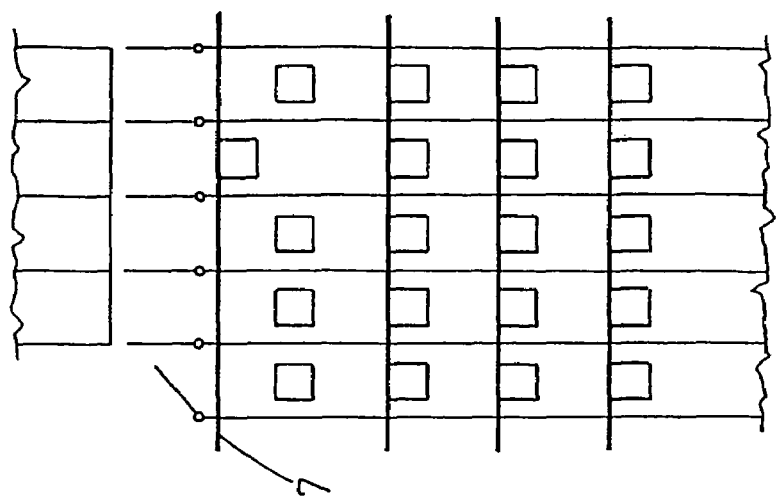
Figure 16:
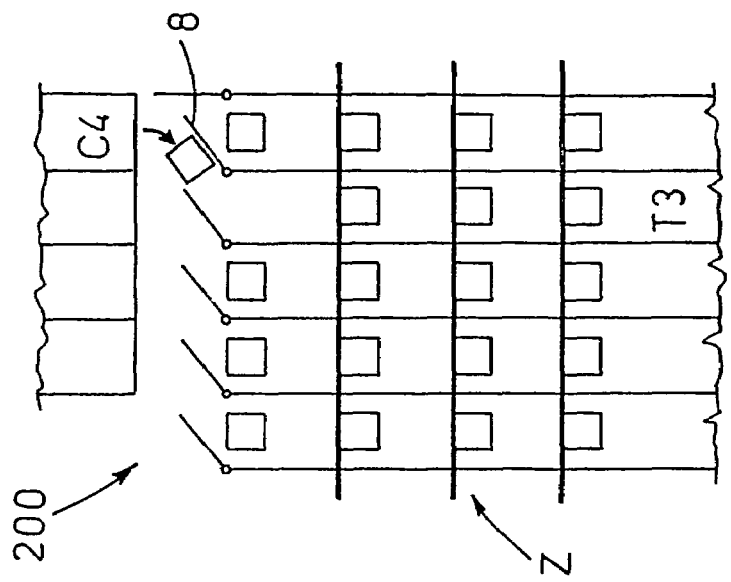
Figure 15:
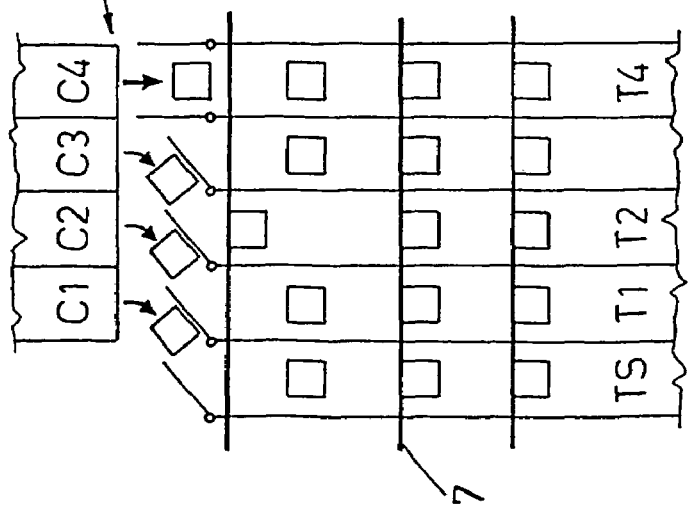

Formation of the Fourth Row (Reference Shall be Made to FIGS. 15, 16 and 17)

the dispensing means S are operated to release four items (which have been indicated with the reference numeral 4), each one from a relevant channel C1, C2, C3, C4 of the four feeding channels Ca, and the above-mentioned four items are directed to relevant four mobile tracks of the five mobile tracks 8; in particular, the item released by the first feeding channel C1 is directed to the supplementary mobile track Ts, the item coming from the second feeding channel C2 is directed to the first mobile track T1, the item coming from the third feeding channel is directed to the second mobile track T2, whereas the item released by the fourth feeding channel C4 is directed to the corresponding fourth mobile track T4;

the dispensing means S are operated again for releasing an additional item (also indicated with the reference numeral 4) from the fourth channel C4 of the four feeding channels, and at the same time the mobile tracks 8 are operated so as to direct this additional item to that mobile track, of the above-mentioned five mobile tracks, which is not engaged by any of the four items released previously; in particular, the additional item is directed to third mobile track T3;

the driving bar 7 is operated for contacting such items to define the fourth row of five items and to transfer the row towards subsequent operating stations.

It is evident from what has been described above that the proposed device, in both the embodiment herein illustrated, makes it possible to obtain, in advantageous way, by means of a succession of extremely simple subsequent steps, and with extremely reliable modes, parcels of items arranged in transversal rows, each row including a number of item larger than the number of single items feeding channels, for example larger by one unit.

It should be noted that the item sorting device subject of the present invention makes it possible to eliminate the complex sorting apparatuses, which have been used up to now in the current packaging lines and commonly known as "diverter" or "combiner" or "sorting machine".

Undoubtedly, this is a remarkable advantage in consideration of both design time and reduction of costs, and also in consideration of the remarkable simplification of the operative modes and operation of the item parcels packaging lines.

Furthermore, the method for sorting the items as described above allows overcoming the drawbacks currently present in the prior art apparatuses, thus giving the forming and packaging automatic lines a great deal of operational flexibility.

In fact, the proposed method allows forming and packaging parcels of items composed by transversal rows comprising any desired number of items, which number is independent from the pre-fixed and pre-determined number of feeding channels; in particular, the proposed method allows item parcels to be obtained, which parcels are composed of transversal rows each one including a number of items larger than the number of feeding channels by at least one unit.

It should also be noted that, the proposed method, after a number of cycles formed by repetition of the relevant operating steps equal to the number N of feeding channels, makes it possible to take over the same number of items from each one of the feeding channels.

All what is described above is intended as an unlimited example only, so that possible variants in the succession or in carrying out the various operation steps, for instance the dispensing means or the movable buffer means operation modes, are anyway considered within the protective scope accorded to the present technical solution, as described above and claimed in the following.

The invention claimed is:

1. A device for sorting items, provided downstream of a first number of feeding channels of a series of items formed and singled out at previous operative stations, said feeding channels being associated in pairs, the latter being spaced from one another by equal steps, and provided, at the relevant output sections, with dispensing members for a controlled release of said items, wherein said device includes: a number of mobile tracks equal to said first number of feeding channels, said mobile tracks being arranged downstream of said feeding channels and operatively associated in pairs, so as to define operating gaps between successive pairs, the gaps facing the above steps, said first mobile tracks being movable in reciprocal synchronism, transversally to said feeding channels; a second number of second mobile tracks, each arranged downstream of said feeding channels and disposed between successive pairs of said first tracks at the operating gaps, said second tracks being movable both in synchronism with said first tracks, transversally to said feeding channels, and in phase relation with operation of said first tracks, transversally to said feeding channels within said operating gaps; said first tracks and said second tracks being designed, due to corresponding movements respectively in synchronism, the first tracks, and in a sequence, in synchronism with the first tracks and in phase relation with the first tracks, the second tracks, to face said feeding channels according to predetermined sequences, for receiving items in a number equal to the sum of said first number of mobile tracks and of said second number of second mobile tracks, said items being released by said feeding channels for defining, in cooperation with driving bars moving longitudinally above the same first and second tracks, for contacting and pulling such items, respective and distinct transversal rows of items, each transversal row including a number of items equal to the sum of said first number and second number of mobile tracks, and for transferring the same rows of items towards subsequent packaging operating stations.

2. A device according to claim 1, wherein said items, which are in a number equal to the sum of said first number and second, number, are released by said feeding channel by means of related dispensing means, in accordance with predetermined sequences which correspond to the operational sequence of said first tracks and said second tracks.

3. A device according to claim 1, wherein said first mobile tracks are interlocked with a first actuating member and said second mobile tracks are interlocked with a second actuating member, said first actuating member and said second actuating member being independent from one another.

4. A device according to claim 1, wherein said first mobile tracks and said second mobile tracks are interlocked with a common actuating member.

5. A device according to claim 1, wherein said feeding channels release single items in accordance with predetermined sequences, which correspond to the operation of said first tracks and said second tracks, so as to obtain single transversal rows, each row including a number of items equal to the sum of said first number and second number.

6. A device according to claim 1, wherein said feeding channels carry out multiple release of items in accordance with predetermined sequences, which correspond to the operation of said first tracks and said second tracks, so as to obtain multiple transversal rows, each row including a number of items equal to the sum of said first number and second number.

7. A method for sorting items, wherein the method includes: arranging a series of items within a first number of feeding channels of said items, said feeding channels being provided, at the relevant output sections, with dispensing members for a controlled release of said items according to predetermined sequences; operating a first number of first mobile tracks equal to said first number of feeding channels, said mobile tracks operated in reciprocal synchronism, and a second number of second mobile tracks, operatively associated to said first mobile tracks, which can be operated both in synchronism with said first tracks, and in phase relation with the operation of these latter, said first tracks and second tracks defining a third number of mobile tracks provided downstream of said feeding channels and being designed to be operated in a way that they face said feeding channels for receiving items released by said dispensing members in a number equal to the sum of said first number and said second number of mobile tracks, in accordance with said predetermined sequences, and for defining, in co-operation with driving bars moving longitudinally above the same mobile tracks for contacting and pulling such items, respective and distinct transversal rows of items, each transversal row including a number of items equal to the sum of said first number and second number of mobile tracks, and for transferring the same rows towards subsequent packaging operating stations.

\* \* \* \* \*